US010749385B2

(12) United States Patent
Reddy et al.

(10) Patent No.: US 10,749,385 B2
(45) Date of Patent: Aug. 18, 2020

(54) DUAL MAGNETIC PHASE MATERIAL RINGS FOR AC ELECTRIC MACHINES

(71) Applicant: General Electric Company, Schenectady, NY (US)

(72) Inventors: Patel Bhageerath Reddy, Niskayuna, NY (US); Min Zou, Schenectady, NY (US); Ayman Mohamed Fawzi El-Refaie, Milwaukee, WI (US); Francis Johnson, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 375 days.

(21) Appl. No.: 15/598,408

(22) Filed: May 18, 2017

(65) Prior Publication Data
US 2018/0337565 A1 Nov. 22, 2018

(51) Int. Cl.
H02K 1/02 (2006.01)
H02K 1/22 (2006.01)
(Continued)

(52) U.S. Cl.
CPC .................. H02K 1/02 (2013.01); H02K 1/22 (2013.01); H02K 1/246 (2013.01); H02K 17/165 (2013.01); H02K 19/103 (2013.01); H02K 19/24 (2013.01)

(58) Field of Classification Search
CPC .......... H02K 1/02; H02K 1/22; H02K 19/103; H02K 1/246; H02K 17/165; H02K 19/24
See application file for complete search history.

(56) References Cited

U.S. PATENT DOCUMENTS 4,724,348 A * 2/1988 Stokes .................... H02K 1/278
310/152
6,274,960 B1 * 8/2001 Sakai ...................... H02K 1/246
310/156.02
(Continued)

FOREIGN PATENT DOCUMENTS

JP 2012-518378 A 8/2012
JP 2014-050218 A 3/2014
(Continued)

OTHER PUBLICATIONS

International Search Report and Written Opinion issued in connection with corresponding PCT Application No. PCT/US2018/022999 dated Jul. 2, 2018.
(Continued)

Primary Examiner — Naishadh N Desai
(74) Attorney, Agent, or Firm — Meagher Emanuel Laks Goldberg & Liao, LLP.

(57) ABSTRACT

An AC electric machine that includes a dual magnetic phase material ring is disclosed. The AC electric machine includes a stator assembly and a rotor assembly positioned within the stator assembly and configured to rotate relative thereto, the rotor assembly comprising a rotor core including a stack of rotor laminations that collectively form the rotor core, the rotor core including a plurality of rotor poles separated by gaps therebetween. The AC electric machine also includes a dual magnetic phase material ring positioned about the stack of rotor laminations, the dual magnetic phase material ring comprising a first ring portion comprising a magnetic portion and a second ring portion comprising a non-magnetic portion.

20 Claims, 9 Drawing Sheets

(51) Int. Cl.
*H02K 19/24* (2006.01)
*H02K 19/10* (2006.01)
*H02K 17/16* (2006.01)
*H02K 1/24* (2006.01)

(56) References Cited

U.S. PATENT DOCUMENTS

| | | |
|---|---|---|
| 6,534,891 B2 | 3/2003 | Kliman et al. |
| 7,652,404 B2 | 1/2010 | El-Refaie et al. |
| 8,018,110 B2 | 9/2011 | Alexander et al. |
| 8,729,766 B2 | 5/2014 | Reutlinger et al. |
| 8,836,196 B2 | 9/2014 | Calley et al. |
| 2009/0021105 A1* | 1/2009 | Evans .................. H02K 1/02 310/261.1 |
| 2013/0214620 A1* | 8/2013 | Kobayashi ............ H02K 1/278 310/43 |
| 2014/0265708 A1 | 9/2014 | Galioto et al. |
| 2015/0115757 A1* | 4/2015 | Reddy .................. H02K 21/12 310/154.26 |
| 2015/0171682 A1* | 6/2015 | Fujisawa .............. H02K 1/2766 310/156.53 |
| 2015/0295454 A1 | 10/2015 | El-Refaie et al. |
| 2016/0087503 A1 | 3/2016 | Galioto et al. |
| 2016/0294236 A1 | 10/2016 | Alexander et al. |

FOREIGN PATENT DOCUMENTS

| | | |
|---|---|---|
| KR | 1020130049189 A | 5/2013 |
| WO | 2011151138 A2 | 12/2011 |

OTHER PUBLICATIONS

Wang et al., "Fabrication and Experimental Analysis of an Axially Laminated Flux-Switching Permanent-Magnet Machine", IEEE Transactions on Industrial Electronics, Feb. 2017, vol. 64, No. 2, pp. 1081-1091.

* cited by examiner

DUAL MAGNETIC PHASE MATERIAL RINGS FOR AC ELECTRIC MACHINES

GOVERNMENT LICENSE RIGHTS

This invention was made with Government support under contract number DE-EE0005573 awarded by the United States Department of Energy. The Government has certain rights in the invention.

BACKGROUND OF THE INVENTION

The invention relates generally to AC electrical machines and, more particularly, to a dual magnetic phase material rings for use in such electrical machines.

The need for high power density and high efficiency electrical machines (i.e., electric motors and generators) has long been prevalent for a variety of applications, particularly for hybrid and/or electric vehicle traction applications. The current trend in hybrid/electric vehicle traction motor applications is to increase rotational speeds to increase the machine's power density, and hence reduce its mass and cost. However, it is recognized that when electrical machines are used for traction applications in hybrid/electric vehicles, there is a clear tradeoff between power density, efficiency, and the machine's constant power speed range—and that this tradeoff presents numerous design challenges.

Specifically, magnetic materials used in rotating electric machines generally serve multiple functions. Efficient coupling of magnetic fluxes to complementary poles across an air gap in the electric machines are desirable. Soft magnetic materials of the magnetic components may also bear a significant fraction of the mechanical and structural loads of the electric machine. Sometimes there may be tradeoffs between efficient magnetic utilization of the material and mechanical load bearing capability of the magnetic materials. Alternatively, sometimes speed rating of a machine may be lowered in order to allow a machine topology with efficient magnetic utilization. Therefore, it is desirable to have a material that can avoid the trade-offs between efficiency and operability of the electric machines by locally controlling the magnitude of the saturation magnetization of the soft magnetic material used in electric machines.

The power density of an electric machine may be increased by increasing the machine size, improving thermal management, increasing rotor speed, or by increasing the magnetic utilization. The magnetic utilization may be increased by using a combination of processing and alloying of a rotor lamination to create a multi-phase magnetic material by developing localized areas of high and low permeability. The localized areas of high and low permeability generally reduce flux losses during rotor operation.

However, while the use of multi-phase magnetic material rotor laminations increases the magnetic utilization of the electric machine, thereby minimizing the flux leakage path and increasing the high-speed power and torque capability of the induction machine without sacrificing power density or efficiency, there are drawbacks associated with such multi-phase magnetic material rotor laminations. That is, the use multi-phase magnetic material rotor laminations results in a lack of saturation flux density as compared to conventional rotor laminations. This low saturation flux density leads to lower power densities in dual phase laminated electric machines, especially under low speed conditions and high saturation conditions.

Therefore, it would be desirable to provide an electric machine, and associated motor components, that provide for reduced leakage reactance in order to improve a high speed performance of the machine, while also providing for the recovery of low speed power densities. It would further be desirable for such components of the electric machine to be provided as add-on components useable with conventional laminations, such that manufacturing of rotors and stators of the electric machine are simplified and the design of the electric machine is not changed substantially.

BRIEF DESCRIPTION OF THE INVENTION

The invention is directed to dual magnetic phase material rings for use in AC electrical machine. The dual magnetic phase material are used in combination with rotor laminations of standard construction, so as to provide desirable high speed performance of the machine, while also providing for the recovery of low speed power densities.

In accordance with one aspect of the invention, an AC electric machine includes a stator assembly and a rotor assembly positioned within the stator assembly and configured to rotate relative thereto, the rotor assembly comprising a rotor core including a stack of rotor laminations that collectively form the rotor core, the rotor core including a plurality of rotor poles separated by gaps therebetween. The AC electric machine also includes a dual magnetic phase material ring positioned about the stack of rotor laminations, the dual magnetic phase material ring comprising a first ring portion comprising a magnetic portion and a second ring portion comprising a non-magnetic portion.

In accordance with another aspect of the invention, a rotor assembly for an AC electric machine includes a rotor core comprising a stack of rotor laminations that collectively form the rotor core, the rotor core including a plurality of rotor poles separated by gaps therebetween. The rotor assembly also includes a dual magnetic phase material sleeve positioned about the rotor core, the dual magnetic phase material sleeve including a first sleeve portion comprising a magnetic portion and a second sleeve portion comprising a non-magnetic portion, wherein the first sleeve portion is adjacent to the rotor poles of the rotor core and the second sleeve portion is adjacent to the gaps between the rotor poles of the rotor core.

In accordance with yet another aspect of the invention, a method for manufacturing an AC electric machine includes providing a stator defining a stator bore and providing a rotor assembly for positioning within the stator bore that is configured to rotate relative thereto. Providing the rotor assembly further comprises arranging and assembling a plurality of rotor laminations to form a rotor core having a plurality of rotor poles separated by gaps therebetween and positioning a dual magnetic phase material ring about the rotor core that is formed of a magnetic phase material that is magnetic in a first state and non-magnetic in a second state, wherein portions of the dual magnetic phase material ring adjacent the plurality of rotor poles are in the first state and wherein portions of the dual magnetic phase material ring adjacent the gaps between the plurality of rotor poles are in the second state.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Figure 1:
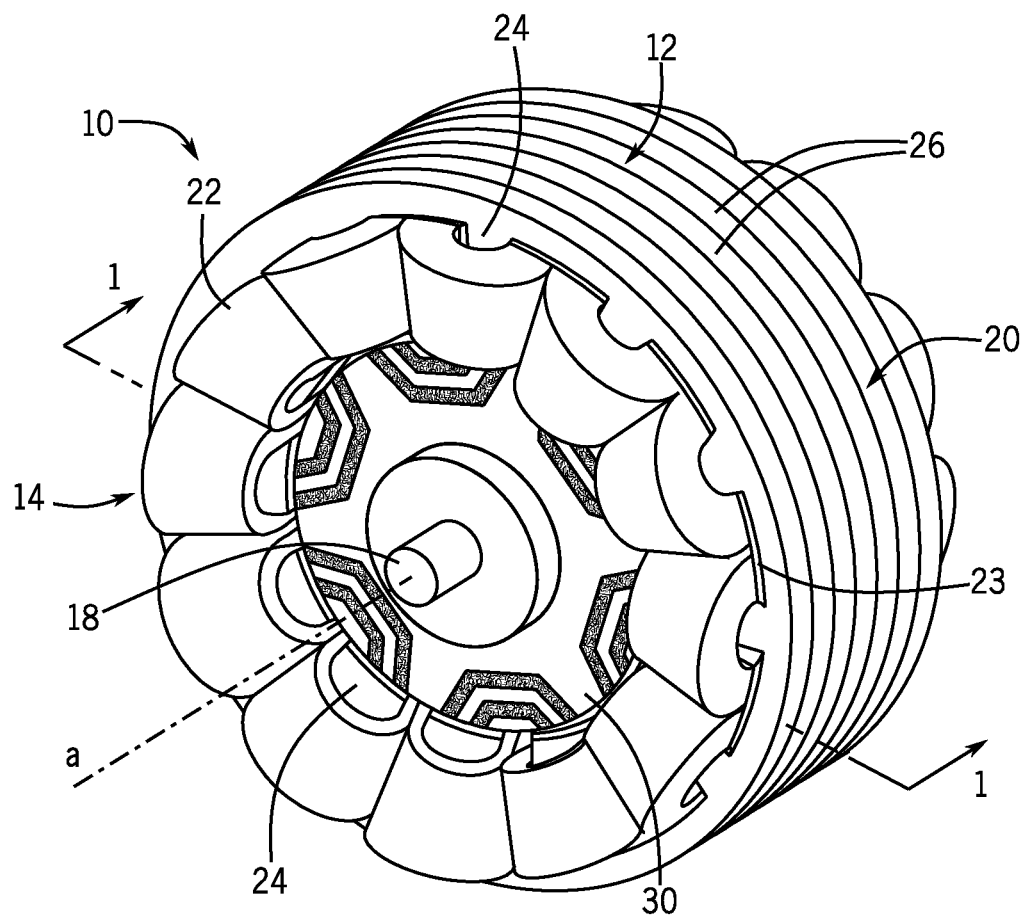
FIGS. 1 and 2 are perspective views of a synchronous reluctance machine that includes a dual magnetic phase material ring therein, according to an embodiment of the invention.

Embodiments of the invention are directed to dual magnetic phase material rings for use in AC electrical machine, with the dual magnetic phase material being used in combination with rotor laminations of standard construction so as to provide desirable high speed performance of the machine, while also providing for the recovery of low speed power densities. While embodiments of the invention are described here below with respect to the inclusion of dual magnetic phase material rings a into synchronous reluctance machine and an induction machine, it is recognized that these dual magnetic phase material rings may be included in other types of AC electrical machines of various construction, including surface permanent magnet machines, for example. Accordingly, it is to be understood that embodiments of the invention are not to be limited to the specific AC electrical machine types described here below.

Referring to FIGS. 1-6, an AC electric machine 10 and respective components thereof are illustrated according to an embodiment of the invention. In the illustrated embodiment, AC electric machine 10 is structured as a synchronous reluctance machine that includes a stator assembly 12 (i.e., "stator") and a rotor assembly 14 (i.e., "rotor") that are substantially concentrically disposed, with the rotor 14 being positioned within a stator bore 16 defined by the stator 12. The rotor 14 can be coupled to a shaft 18 that is configured to rotate about an axis a.

Stator 12 is formed of a stator core 20 and windings 22 that are wound on the stator core 20. The stator core 20 is generally defined to include a core main body 23 and a plurality of teeth 24 positioned at a predetermined pitch along a circumferential direction of the main body 22. In an exemplary embodiment, the stator core 20 is composed of a large number of thin plates or laminations 26 that are stacked axially and pressed to form the stator core 20. The laminations 26 are formed of a material that can be stamped or cut, for example, to form the metallic laminations. According to an embodiment of the invention, the laminations 26 may be made of made of an electromagnetic steel material. Windings 22 may be wound on the respective teeth 24, with slots 28 formed between adjacent teeth 24 along the circumferential direction to accommodate the windings 22.

The rotor 14 of synchronous reluctance machine 10 is formed of a plurality of rotor laminations 30 dispersed axially along the length of rotor 14 and that are stacked axially and pressed to form the rotor. The rotor laminations 30 are formed of a material that can be stamped or cut, for example, to form the metallic laminations, such as silicon-steel for example. Each rotor lamination 30 includes therein intermittent air gaps 32 that define a number of rotor poles 34 acting as salient magnetic poles through magnetic reluctance. As is typical in synchronous reluctance electric machines, the number of rotor poles 34 is equal to the number of stator poles 36, with the rotor poles 34 being arranged to introduce internal flux "barriers", holes which direct the magnetic flux along a so-called direct axis.

In operation of synchronous reluctance machine 10, an excitation current is provided to stator 12 such that current flows through stator windings 22 and causes the stator poles 36 to become energized. When a stator pole 36 is energized, the rotor torque is in the direction that will reduce reluctance. Thus, the nearest rotor pole 34 is pulled from the unaligned position into alignment with the stator field (a position of less reluctance). In order to sustain rotation, the stator field must rotate in advance of the rotor poles 34, thus constantly "pulling" the rotor along.

Figure 2:
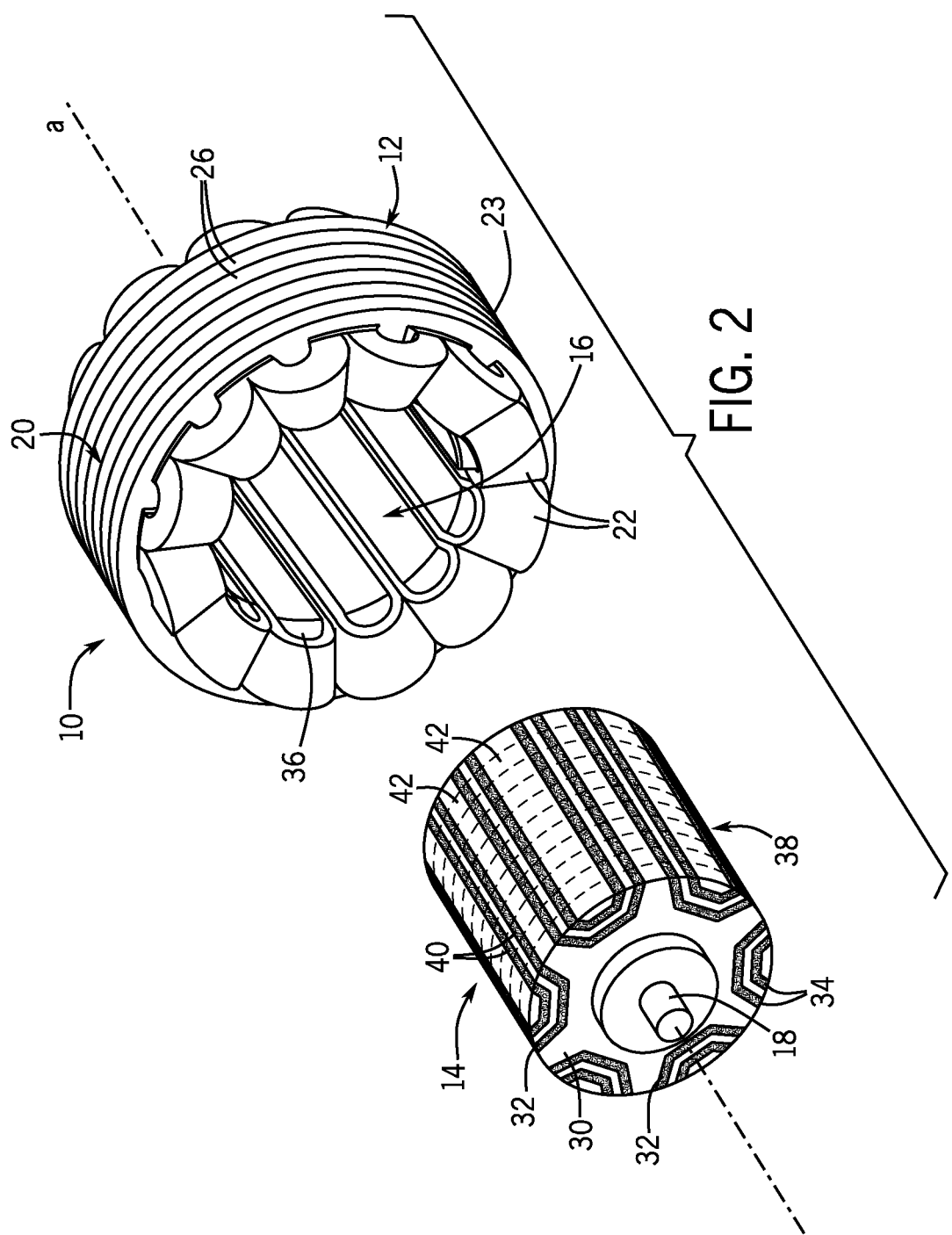

As further shown in FIGS. 1 and 2, according to embodiments of the invention, a sleeve or ring 38 is included in of synchronous reluctance machine 10 and is positioned about the stack of rotor laminations 30, such as by being shrink fit about the stack of rotor laminations 30. The ring 38 is in the form a dual magnetic phase material that includes portions that are magnetic and portions that are non-magnetic (i.e., magnetic portions 40 and non-magnetic portions 42)—with the ring 38 being formed such that the magnetic portions 40 align with the rotor poles 34 of rotor 14 and the non-magnetic portions 42 align with the air gaps 32 between the rotor poles 34. In one embodiment, the ring 38 is composed of a dual magnetic phase material such as a silicon-steel-chromium material or another suitable material that can be selectively treated to form the magnetic portions 40 and the non-magnetic portions 42 in the ring 38. For example, the dual magnetic phase material can initially have magnetic properties, with a heat treating being applied to desired areas of the ring 38 to render those areas non-magnetic and thereby minimize magnetic leakage flux through the non-magnetic areas. It is recognized, however, that other processes/treatments could be employed to render areas of the ring 38 non-magnetic, such as mechanical stress or nitriding treatments.

The inclusion of dual magnetic phase material ring 38 in synchronous reluctance machine 10, and the combination thereof with conventional rotor laminations 30, beneficially allows for efficient operation of the machine at both low and high speeds, and at low and high saturation conditions. That is, the conventional rotor laminations 30 (i.e., formed of only a single magnetic phase material) provide a desirable level of saturation flux density so as to provide for efficient low speed power densities in the machine 10 (especially under low speed conditions, high saturation conditions), while the inclusion of the dual phase magnetic material ring 38 alongside the conventional rotor laminations 30 provide for efficient operation and performance of the machine at high speed conditions.

Figure 3:
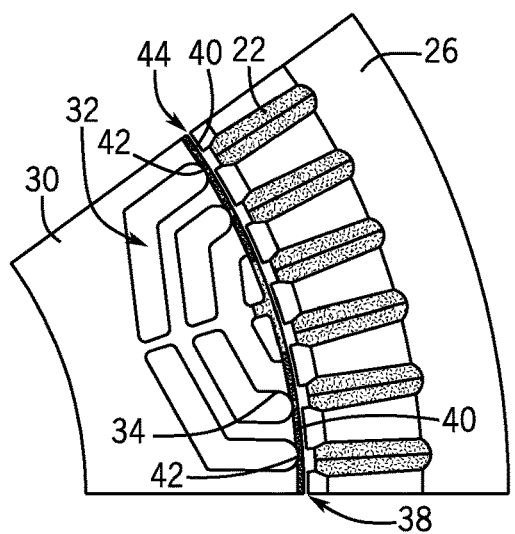
FIGS. 3-6 are partial cross sectional views of a rotor lamination and a dual magnetic phase material ring in the synchronous reluctance machine of FIGS. 1 and 2, taken along line 1-1 of FIG. 1, according to embodiments of the invention.
Figure 4:
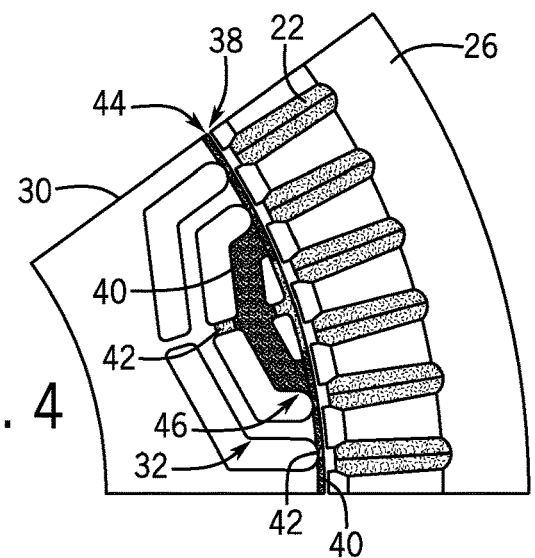
Figure 5:
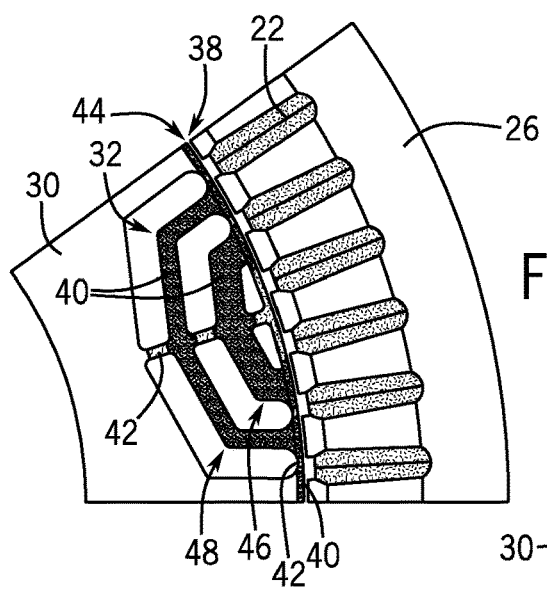
Figure 6:
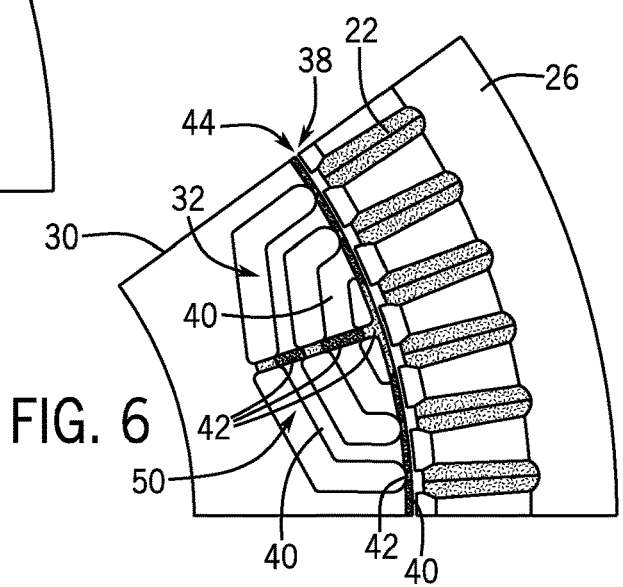

Referring now to FIGS. 3-6, various designs of dual magnetic phase material rings that may be included in synchronous reluctance machine 10 are shown in cross-section (taken along line 1-1 of FIG. 1), according to embodiments of the invention. FIG. 3 (Ring_V1) illustrates a true cylindrical profile 44 of the dual magnetic phase material ring 38 that may be included in machine 10, with such a cylindrical ring being easily shrink fit onto the stack of rotor laminations 30. FIGS. 4-6 illustrate more complex designs of dual magnetic phase material rings that may be included in machine 10 and formed to specifically mate with corresponding designs of rotor laminations 30, with the specific shape and features of these ring structures being designed to provide desirable power capability and power density/power factor in the machine 10, as explained in greater detail below.

The dual magnetic phase material ring 38 of FIG. 4 (Ring_V2) is formed with an outer ring/sleeve 44 and a generally U-shaped structure 46 that extends radially inward from the outer ring/sleeve 44. The U-shaped structure 46 is formed as a magnetic portion 40 of the magnetic phase material ring 38, with connecting portions that connect the U-shaped 46 structure to the outer ring/sleeve 44 and to the rotor laminations 30 being formed as non-magnetic portions 42.

The dual magnetic phase material ring of FIG. 5 (Ring_V3) is formed with a cylindrical outer ring/sleeve 44 and a generally double U-shaped structure that extends radially inward from the outer ring/sleeve 44. The double U-shaped structure is formed of two individual U-shaped structures 46, 48 that are magnetic portions 40 of the magnetic phase material ring 38, with connecting portions that connect the double U-shaped structure 46, 48 to the outer ring/sleeve 44 and to the rotor laminations 30 being formed as non-magnetic portions 42.

The dual magnetic phase material ring of FIG. 6 (Ring_V4) has a primarily cylindrical profile, but includes a linear protrusion 50 that extends radially inward from an outer ring/sleeve 44 and through a majority of the rotor lamination 30. As can be seen in FIG. 5, alternating portions of the linear protrusion 50 are magnetic 40 and non-magnetic 42, with the magnetic portions 40 being aligned with material of the rotor laminations 30 and the non-magnetic portions 42 being aligned with intermittent air gaps 32 formed in the rotor laminations 30.

Figure 7:
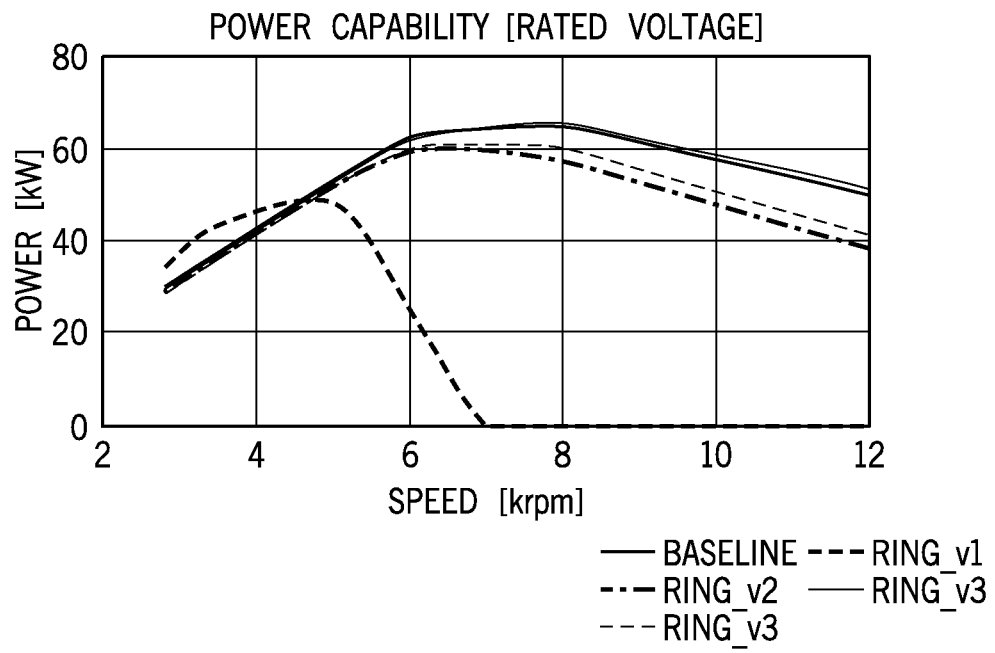
FIG. 7 is a graph illustrating a power capability of a synchronous reluctance machine when incorporating the dual magnetic phase material rings of FIGS. 3-6.
Figure 8:
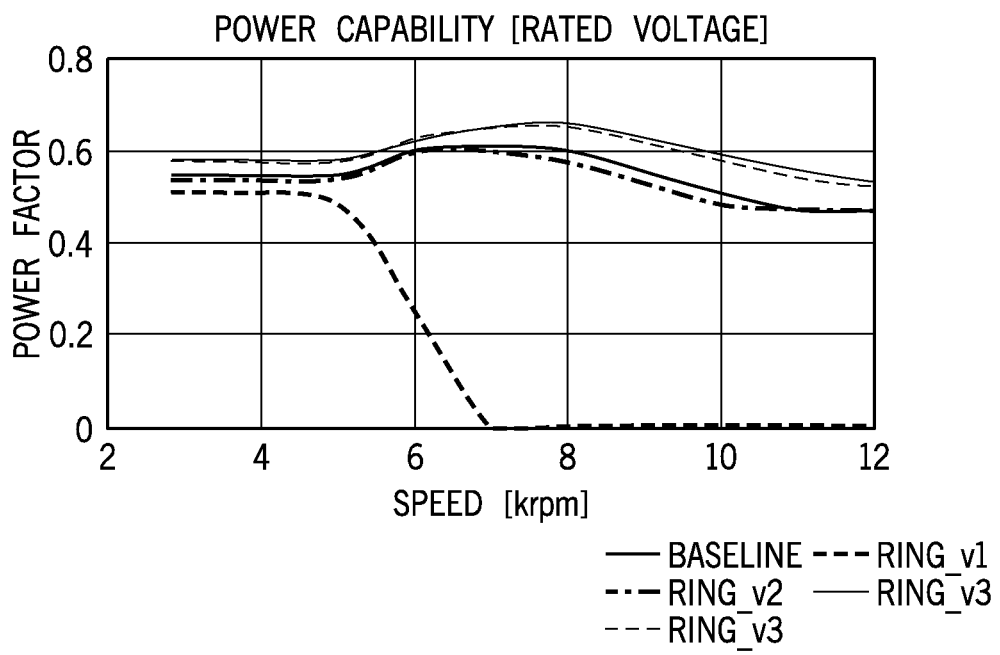
FIG. 8 is a graph illustrating a power factor of a synchronous reluctance machine when incorporating the dual magnetic phase material rings of FIGS. 3-6.
Figure 9:
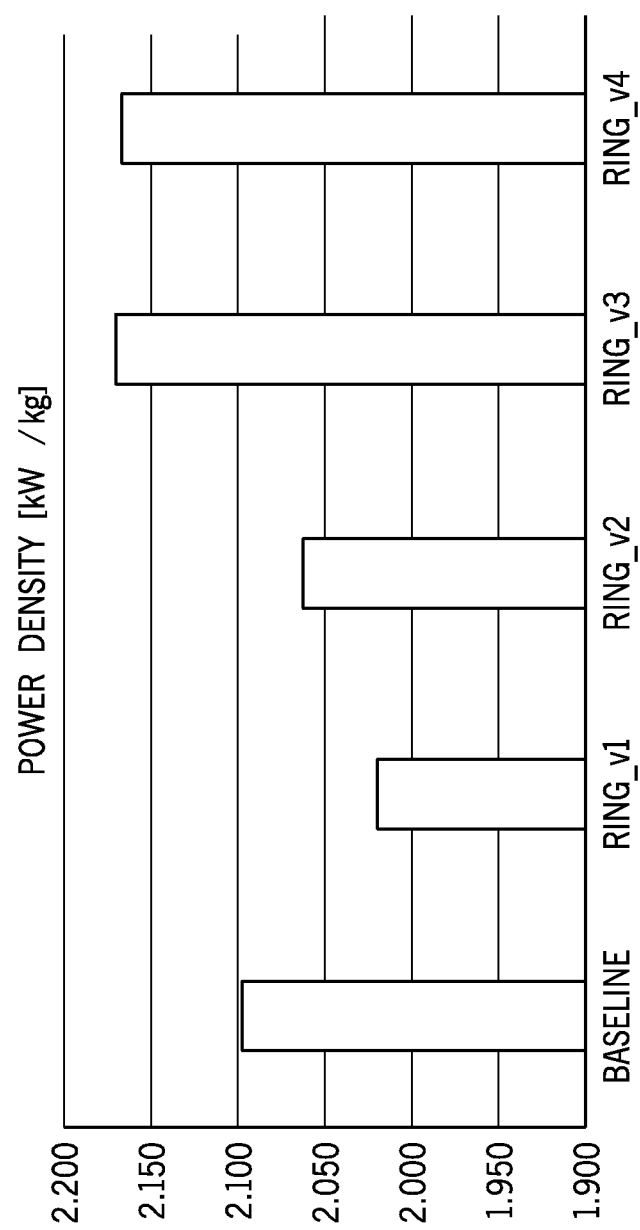
FIG. 9 is a graph illustrating a power density of a synchronous reluctance machine when incorporating the dual magnetic phase material rings of FIGS. 3-6.

As indicated above, the specific shape and features of the dual magnetic phase material ring may be selected to provide desirable power capability and power density/power factor in the machine 10. As can be seen in FIGS. 7-9, the power capability, power factor, and power density in the machine 10 will vary based on the design of the dual magnetic phase material ring 38, with these parameters illustrated therein in comparison to a "baseline" value of an electric machine with no dual magnetic phase material ring included therein. As seen in FIGS. 7 and 8, the power capability (FIG. 7) and power factor (FIG. 8) vary dependent on the ring construction, with the dual magnetic phase material ring of FIG. 5 (Ring_V3) showing preferred values/ levels of power capability and power factor across a full operating range of the machine. As seen in FIG. 9, the dual magnetic phase material rings of FIGS. 4 and 5 (Ring_V2 and Ring_V3) show the best levels of power density.

Figure 10:
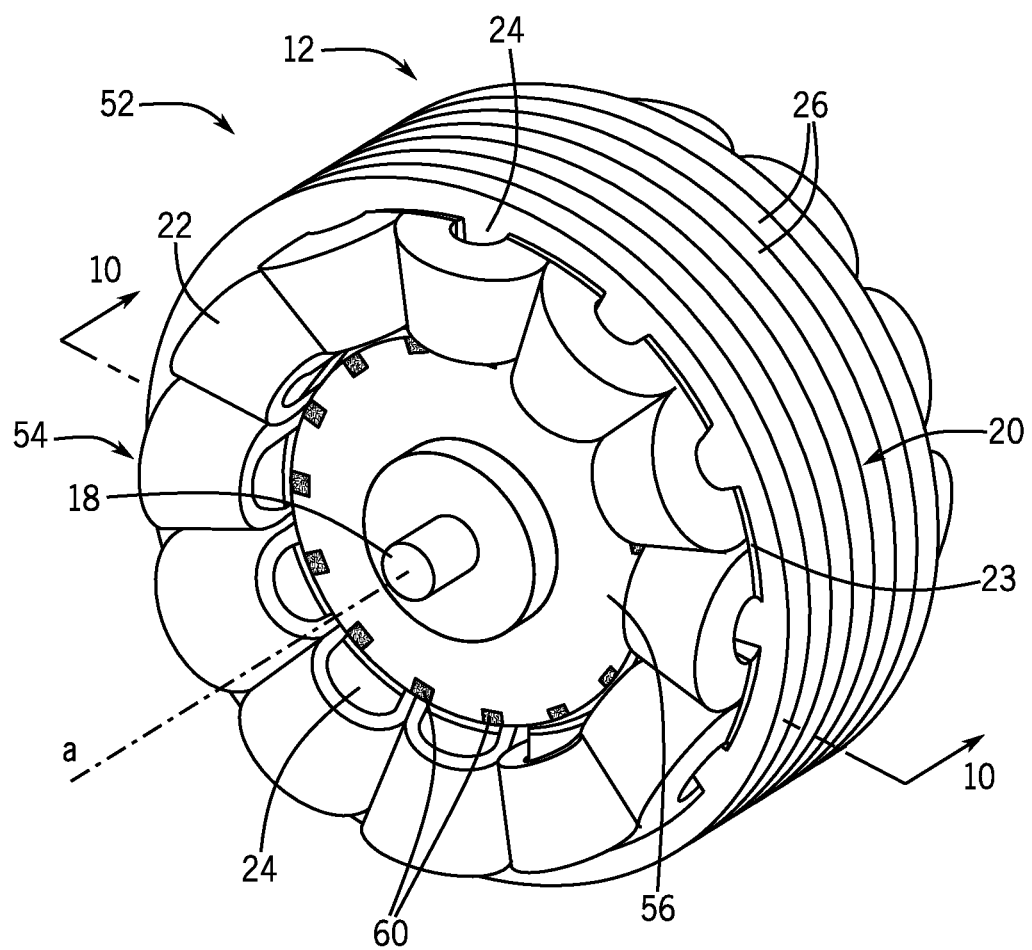
FIGS. 10 and 11 are perspective views of a squirrel cage AC induction machine that includes a dual magnetic phase material ring therein, according to an embodiment of the invention.
Figure 11:
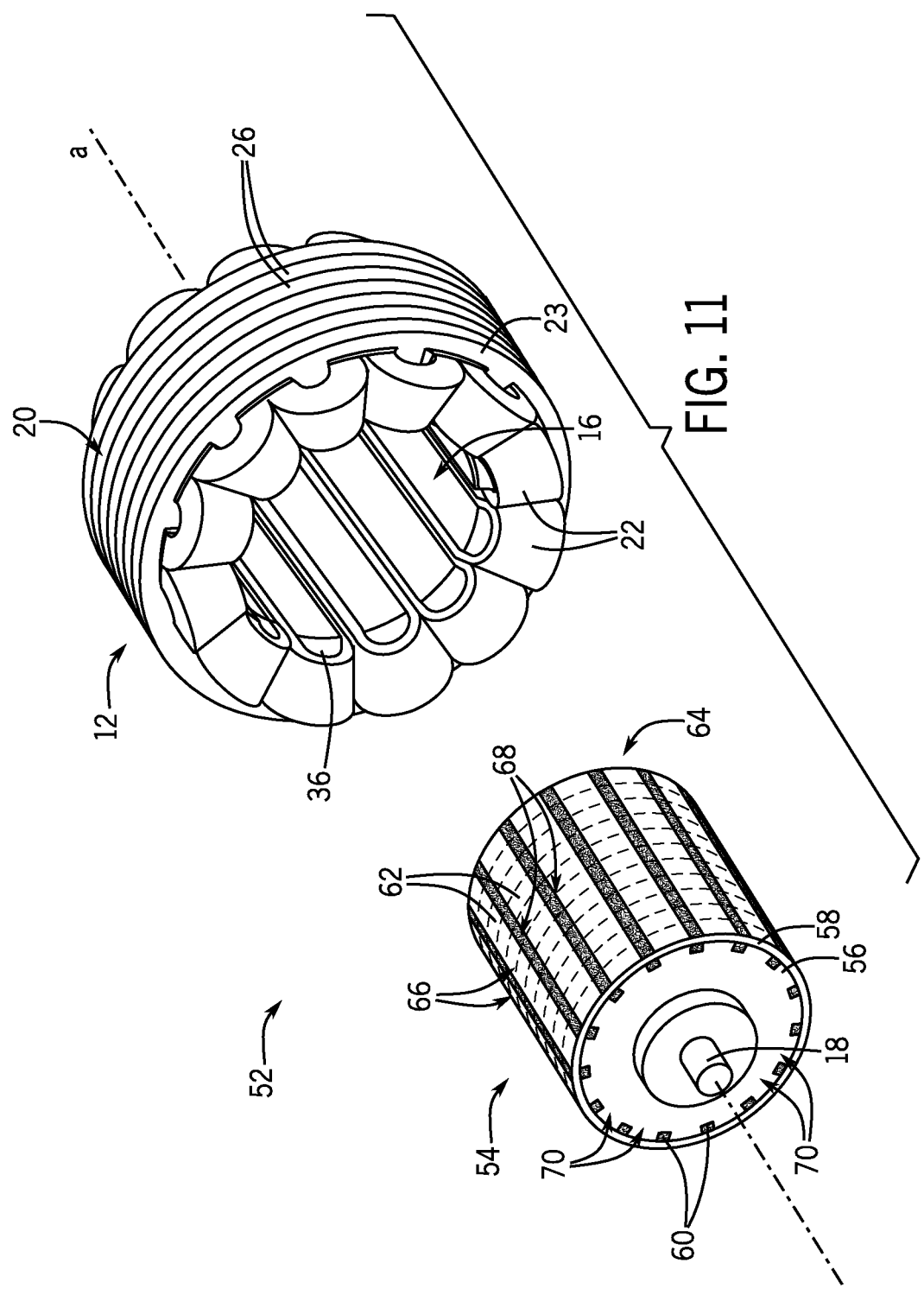
Figure 12:
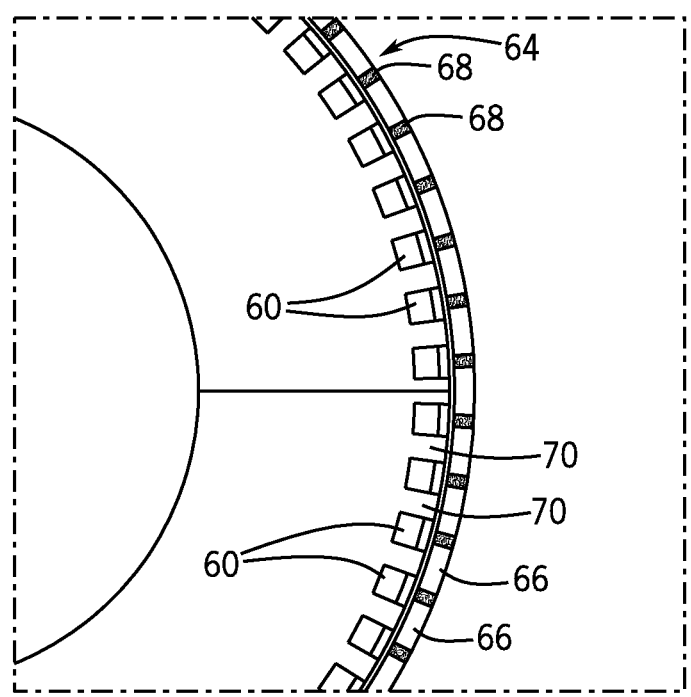
FIG. 12 is a partial cross sectional view of a rotor lamination and the dual magnetic phase material ring in the AC induction machine of FIGS. 10 and 11, taken along line 10-10 of FIG. 10, according to an embodiment of the invention.

Referring now to FIGS. 10-12, an AC induction machine 52, along with respective components thereof, is illustrated according to an embodiment of the invention—with like components in induction machine 52 and synchronous reluctance machine 10 being identified with common numbers. Induction motor 52 includes a stator assembly 12 (i.e., "stator") and a rotor assembly 54 (i.e., "rotor"). Stator 12 is formed of a stator core 20 and windings 22 that are wound on the stator core 20. The stator core 20 is generally defined to include a core main body 23 and a plurality of teeth 24 positioned at a predetermined pitch along a circumferential direction of the main body 20. In an exemplary embodiment, the stator core 20 is composed of a large number of thin plates or laminations 26 that are stacked axially and pressed to form the stator core. The laminations 26 are formed of a material that can be stamped or cut, for example, to form the metallic laminations. According to an embodiment of the invention, the laminations 26 may be made of made of an electromagnetic steel material. Windings 22 may be wound on the respective teeth 24, with slots (not shown) formed between adjacent teeth 24 along the circumferential direction to accommodate the windings.

As shown in FIG. 11, rotor assembly 54 is constructed as a squirrel-cage type rotor that includes a rotor core 56, end rings 58, and a number of rotor bars 60 coupled to the rotor core 56 and extending between the end rings 58. The rotor core 56 is not formed as a single, solid machined piece, but instead is comprised of a plurality of thin plate rotor laminations 62 that are stacked axially and pressed to form the rotor, with such a rotor lamination 62 being shown in FIG. 12. Each of the laminations 62 is formed of a material that can be stamped or cut, for example, to form the metallic laminations. The rotor bars 60 of the rotor assembly 54 are positioned within slots formed in the rotor core 56 (i.e., the slots in each lamination 62) and can be formed either as solid copper bars that are inserted into the slots and brazed to two solid copper end-rings at either end of the rotor, or can be casted out of aluminum or copper using the assembled rotor core as the mold for the bar sections of the cage.

In operation of AC induction motor 52, an excitation current is provided to stator 12 such that current flows through stator windings 22. The flow of current through windings 22 creates a rotating magnetic field in an air gap (not shown) between the stator 12 and rotor 54 that induces current flow through rotor bars 60. These currents interact with the rotating magnetic field created by the stator 12 and, in effect, cause a rotational motion on the rotor 54.

As further shown in FIGS. 11 and 12, according to embodiments of the invention, a sleeve or ring 64 is included in induction machine 52 and is positioned about the rotor 54, such as by being shrink fit thereabout. The ring 64 is in the form a dual magnetic phase material that includes portions that are magnetic and portions that are non-magnetic 66, 68—with the ring being formed such that the magnetic portions 66 align with rotor poles 70 of rotor 54 and the non-magnetic portions 68 align with the slots between the rotor poles 70. In one embodiment, the ring 64 is composed of a dual magnetic phase material such as a silicon-steel—chromium material or another suitable material that can be selectively treated to form the magnetic portions 66 and the non-magnetic portions 68 in the ring. For example, the dual magnetic phase material can initially have magnetic properties, with a heat treating being applied to desired areas of the ring 64 to render those areas non-magnetic. It is recognized, however, that other processes/treatments could be employed to render areas of the ring 64 non-magnetic, such as mechanical stress or nitriding treatments.

The inclusion of a dual magnetic phase material ring 64 in induction machine 52, and the combination thereof with conventional rotor laminations 62, beneficially allows for efficient operation of the machine 52 at both low and high speeds, and at low and high saturation conditions. That is, the conventional rotor laminations 62 provide a desirable level of saturation flux density so as to provide for efficient low speed power densities in the machine 52 (especially under low speed conditions, high saturation conditions), while the inclusion of the dual phase magnetic material rings 64 alongside the conventional rotor laminations 62 provide for efficient operation and performance of the machine at high speed conditions.

Figure 13:
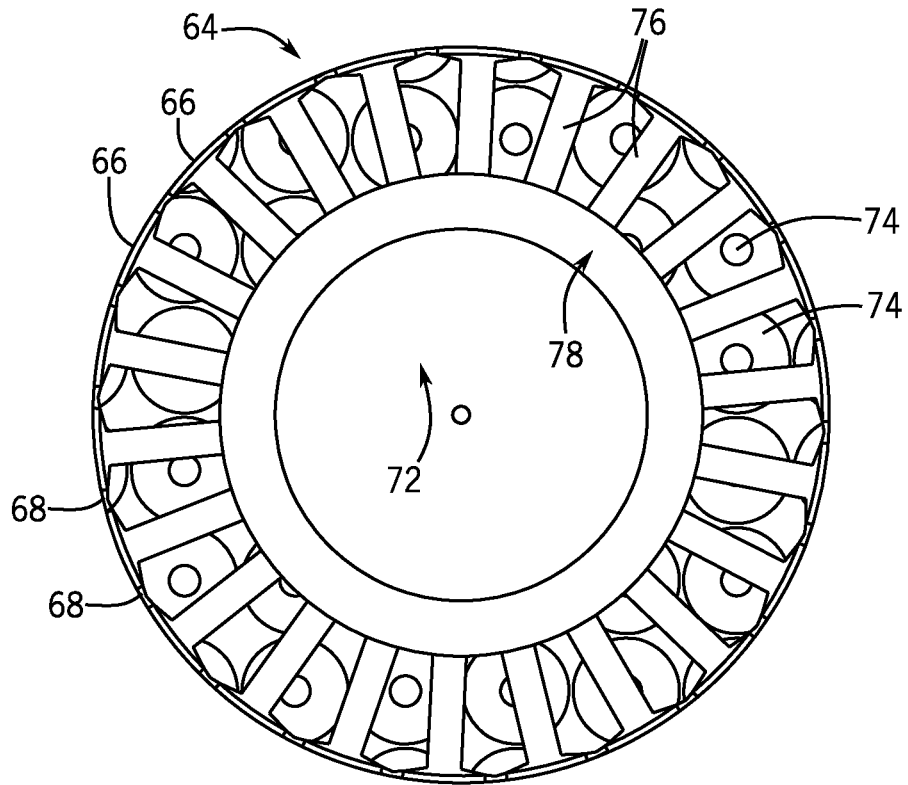
FIGS. 13 and 14 a partial cross sectional view of a rotor lamination and a dual magnetic phase material ring for use in a wound rotor AC induction machine, according to an embodiment of the invention.
Figure 14:
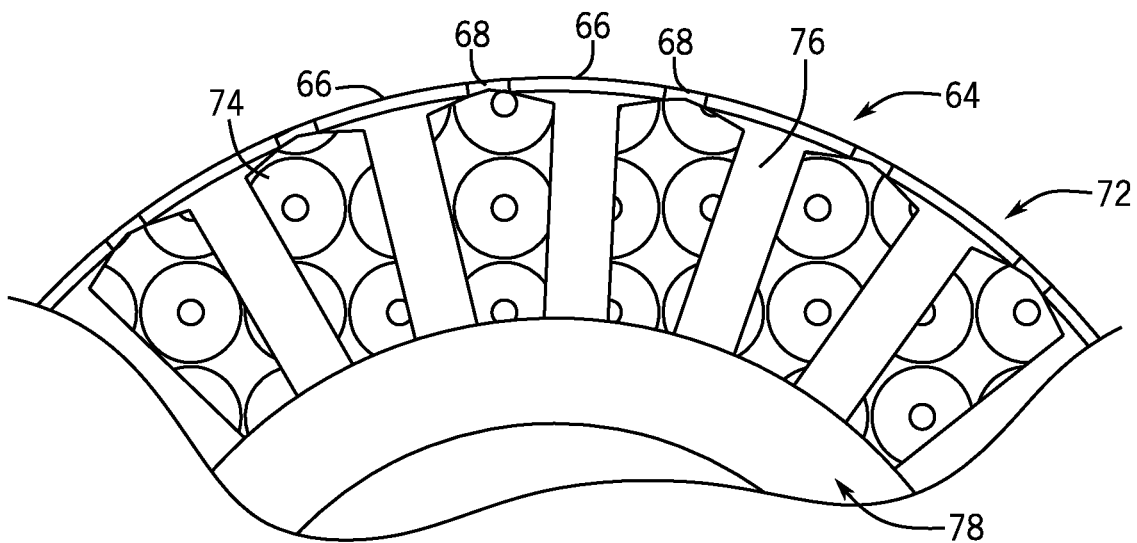

While the induction machine 52 of FIGS. 10-12 is shown as including a squirrel-cage rotor, it is recognized that an embodiment of the invention could instead be constructed as an induction machine having a wound field rotor. Referring now to FIGS. 13 and 14, a wound field rotor 72 for use in an induction machine is shown that includes a plurality of conductive wires 74 wound within slots between poles 76 of a rotor core 78. Similar to the induction machine 52 having a squirrel-cage rotor (FIGS. 10-12), a dual magnetic phase material ring 64 is positioned about the rotor (i.e., about rotor core 78 and rotor windings 74) that includes portions that are magnetic 66 and portions that are non-magnetic 68—with the ring 64 being formed such that the magnetic portions 66 align with rotor poles 76 of rotor 72 and the non-magnetic portions 68 align with the slots between the rotor poles 76. Again, the inclusion of dual magnetic phase material ring 64 in an induction machine, and the combination thereof with conventional rotor laminations 62, beneficially allows for efficient operation of the machine at both low and high speeds, and at low and high saturation conditions, with desirable power capability and power densities being provided.

Beneficially, embodiments of the invention thus provide an AC electric machine having conventional rotor laminations (such as those formed of silicon-steel for example) with a singular magnetic phase and a ring or sleeve about the rotor that is formed of a dual magnetic phase material. The combination of the conventional rotor laminations and a dual magnetic phase material ring in the electric machine allows for efficient operation of the machine at both low and high speeds, and at low and high saturation conditions—with the conventional rotor laminations providing a desirable level of saturation flux density so as to provide for efficient low speed power densities in the machine (especially under low speed conditions, high saturation conditions) and the dual phase magnetic material rings alongside the conventional rotor laminations providing for efficient operation and performance of the machine at high speed conditions. As the rotor laminations are conventional laminations, the cost and complexity of manufacturing the rotor is reduced, particularly in comparison to rotors with dual magnetic phase material laminations.

Therefore, according to one embodiment of the invention, an AC electric machine includes a stator assembly and a rotor assembly positioned within the stator assembly and configured to rotate relative thereto, the rotor assembly comprising a rotor core including a stack of rotor laminations that collectively form the rotor core, the rotor core including a plurality of rotor poles separated by gaps therebetween. The AC electric machine also includes a dual magnetic phase material ring positioned about the stack of rotor laminations, the dual magnetic phase material ring comprising a first ring portion comprising a magnetic portion and a second ring portion comprising a non-magnetic portion.

According to another embodiment of the invention, a rotor assembly for an AC electric machine includes a rotor core comprising a stack of rotor laminations that collectively form the rotor core, the rotor core including a plurality of rotor poles separated by gaps therebetween. The rotor assembly also includes a dual magnetic phase material sleeve positioned about the rotor core, the dual magnetic phase material sleeve including a first sleeve portion comprising a magnetic portion and a second sleeve portion comprising a non-magnetic portion, wherein the first sleeve portion is adjacent to the rotor poles of the rotor core and the second sleeve portion is adjacent to the gaps between the rotor poles of the rotor core.

According to yet another embodiment of the invention, a method for manufacturing an AC electric machine includes providing a stator defining a stator bore and providing a rotor assembly for positioning within the stator bore that is configured to rotate relative thereto. Providing the rotor assembly further comprises arranging and assembling a plurality of rotor laminations to form a rotor core having a plurality of rotor poles separated by gaps therebetween and positioning a dual magnetic phase material ring about the rotor core that is formed of a magnetic phase material that is magnetic in a first state and non-magnetic in a second state, wherein portions of the dual magnetic phase material ring adjacent the plurality of rotor poles are in the first state and wherein portions of the dual magnetic phase material ring adjacent the gaps between the plurality of rotor poles are in the second state.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An AC electric machine comprising:
    a stator assembly; and
    a rotor assembly positioned within the stator assembly and configured to rotate relative thereto, the rotor assembly comprising a rotor core including a stack of rotor laminations that collectively form the rotor core, the rotor core including a plurality of rotor poles separated by gaps therebetween; and
    a dual magnetic phase material ring positioned about the stack of rotor laminations, the dual magnetic phase material ring comprising:
        a first ring portion comprising a magnetic portion; and
        a second ring portion comprising a non-magnetic portion.

2. The AC electric machine of claim 1 wherein the first ring portion is adjacent to the rotor poles of the rotor core and the second ring portion is adjacent to the gaps between the rotor poles of the rotor core.

3. The AC electric machine of claim 1 wherein the second ring portion comprises a treated portion of the ring, with the treating of the second ring portion rendering the dual magnetic phase material of the ring non-magnetic at the locations of the second ring portion.

4. The AC electric machine of claim 3 wherein the treated portion comprises one of a heat treated portion, a portion having a nitriding treatment performed thereon, and a portion having mechanical stress applied thereto.

5. The AC electric machine of claim 2 wherein the stator assembly and the rotor core comprise laminations having a single magnetic phase, and wherein the dual magnetic phase material ring being used in combination with the stator and rotor laminations having a single magnetic phase provides a consistent power density for the AC electric machine during low and high speed operation.

6. The AC electric machine of claim 1 wherein the dual magnetic phase material ring comprises an integral, non-segmented ring formed as a single piece from a single magnetic phase material that is treated to form the first and second portions.

7. The AC electric machine of claim 1 wherein the dual magnetic phase material ring has a ring shape.

8. The AC electric machine of claim 1 wherein the dual magnetic phase material ring comprises:
an outer ring; and
one or more U-shaped structures that extend radially inward from the outer ring, wherein each of the one or more U-shaped structures is formed as a magnetic portion of the dual magnetic phase material ring, with connecting portions that connect the one or more U-shaped structures to the outer ring and to the rotor laminations being formed as non-magnetic portions.

9. The AC electric machine of claim 1 wherein the dual magnetic phase material ring comprises:
an outer ring; and
a linear protrusion that extends radially inward from the outer ring and through a majority of the rotor core, with alternating portions of the linear protrusion being magnetic and non-magnetic, with the magnetic portions being aligned with material of the rotor core and the non-magnetic portions being aligned with intermittent air gaps formed in the rotor core.

10. The AC electric machine of claim 1 wherein the AC electric machine comprises one of a synchronous reluctance machine, an induction machine and a permanent magnet machine.

11. A rotor assembly for an AC electric machine, the rotor assembly comprising:
a rotor core comprising a stack of rotor laminations that collectively form the rotor core, the rotor core including a plurality of rotor poles separated by gaps therebetween; and
a dual magnetic phase material sleeve positioned about the rotor core, the dual magnetic phase material sleeve comprising:
a first sleeve portion comprising a magnetic portion; and
a second sleeve portion comprising a non-magnetic portion;
wherein the first sleeve portion is adjacent to the rotor poles of the rotor core and the second sleeve portion is adjacent to the gaps between the rotor poles of the rotor core.

12. The rotor assembly of claim 11 wherein the second sleeve portion comprises a treated portion of the sleeve, with the treating of the second sleeve portion rendering the dual magnetic phase material of the sleeve non-magnetic at the locations of the second sleeve portion.

13. The rotor assembly of claim 11 wherein the stack of rotor laminations comprises laminations having a single magnetic phase, and wherein the dual magnetic phase material sleeve used in combination with the stack of rotor laminations having a single magnetic phase provides a consistent power density for the AC electric machine during low and high speed operation.

14. The rotor assembly of claim 11 wherein the sleeve comprises an outer cylindrical sleeve.

15. The rotor assembly of claim 14 wherein the sleeve further comprises one or more U-shaped structures that extend radially inward from the outer cylindrical sleeve, wherein each of the one or more U-shaped structures is formed as a magnetic portion of the dual magnetic phase material ring, with connecting portions that connect the one or more U-shaped structures to the outer ring and to the rotor laminations being formed as non-magnetic portions.

16. The rotor assembly of claim 14 wherein the sleeve further comprises a linear protrusion that extends radially inward from the outer cylindrical sleeve and through a majority of the rotor core, with alternating portions of the linear protrusion being magnetic and non-magnetic, with the magnetic portions being aligned with material of the rotor core and the non-magnetic portions being aligned with intermittent air gaps formed in the rotor core.

17. A method for manufacturing an AC electric machine, the method comprising:
providing a stator defining a stator bore;
providing a rotor assembly for positioning within the stator bore that is configured to rotate relative thereto, wherein providing the rotor assembly comprises:
arranging and assembling a plurality of rotor laminations to form a rotor core, the rotor core having a plurality of rotor poles separated by gaps therebetween; and
positioning a dual magnetic phase material ring about the rotor core that is formed of a magnetic phase material that is magnetic in a first state and nonmagnetic in a second state, wherein portions of the dual magnetic phase material ring adjacent the plurality of rotor poles are in the first state and wherein portions of the dual magnetic phase material ring adjacent the gaps between the plurality of rotor poles are in the second state.

18. The method of claim 17 further comprising treating the dual magnetic phase material ring to put portions of the dual magnetic phase material ring in the nonmagnetic second state slot, the treating comprising one of heat treating, nitriding, and applying mechanical stress to render the portions non-magnetic.

19. The method of claim 17 wherein the ring comprises a cylindrical ring.

20. The method of claim 19 wherein the ring further comprises one or more U-shaped structures that extend radially inward from the cylindrical ring, wherein each of the one or more U-shaped structures is in the first state, with connecting portions that connect the one or more U-shaped structures to the cylindrical ring and to the rotor laminations being in the second state.

* * * * *